United States Patent Office 2,967,801
Patented Jan. 10, 1961

2,967,801

USE OF VITAMIN D IN PREVENTING HYPERCALCURIA RESULTING FROM ADRENAL CORTICAL STEROID ADMINISTRATION

Irwin Clark, Plainfield, N.J., assignor to Merck & Co., Inc., Rahway, N.J., a corporation of New Jersey No Drawing. Filed Mar. 3, 1958, Ser. No. 718,459

13 Claims. (Cl. 167—77)

The present invention relates to the use of vitamin D in preventing hypercalcuria, and more particularly to the use of vitamin D in preventing hypercalcuria which occurs as a result of adrenal cortical steriod administration.

Biologically active steroids such as prednisolone, cortisone and hydrocortisone are often prescribed clinically in the treatment of various malfunctions of the body. In certain cases, steroids are administered because of their adrenal cortical action.

It has been observed heretofore that when steroids are administered for clinical purposes a certain undesirable side effect takes place, namely, an above normal increase of calcium excretion in the urine and feces. Unfortunately, such increased loss of calcium from the body over a period of time eventually leads to osteoporosis. Consequently, the prolonged administration of adrenal cortical hormones renders the bones susceptible to spontaneous bone fractures. Inasmuch as continued administration of these hormones causes such deleterious side effects, any agent which is capable of restoring the calcium balance in the body to normal levels is of considerable therapeutic value.

Various theories have been advanced with respect to bone metabolism and calcium balance in the body. Moreover, the effects of certain agents on this balance have been studied. In this connection, the concept of bone metabolism has been examined in W. Bauer, J. Aub and F. Albright, J. Expm. Med., vol. 49, pages 145–160, 1929, as well as in H. Z. Hollinger and C. J. Pattee, Canad. Med. Assn. J., vol. 74, pages 912–921, and vol. 75, pages 941–948, 1956. Various factors important in bone formation as well as in bone resorption are considered in the literature including the action of steroid compounds and the action of vitamin D.

In accordance with the present invention it has been discovered that the calcium excreting effects of steroids are very significantly influenced by the simultaneous presence of vitamin D in the body. By means of radiocalcium traces, it has been established that the administration of vitamin D in conjunction with biologically active steroids such as prednisolone, cortisone and hydrocortisone decreases the excretion of this essential body mineral in comparison to the amount excreted when the steroid alone is administered.

It is well recognized that the best indication of bone metabolism is urinary calcium data since calcium derived from bone is rapidly equilibrated with extracellular fluid and readily cleared through the kidney.

In this connection, it will be appreciated that the measurement of radiocalcium excretion is a suitable method for ascertaining the effects of steroid and vitamin D action upon bone metabolism.

Hence, in an experiment in which rats had been receiving a constant quantity of hydrocortisone subcutaneously, upon the coadministration of graded doses of vitamin D orally in addition to the steroid, these rats exhibited a drop in radio-calcium excretion from above normal to normal levels.

In Table I the importance which vitamin D plays in restoring calcium excretion to normal values is graphically illustrated. The results set forth are expressed in values relative to the control which was arbitrarily set at 100.

Table I

| Dose/100 gms. of rat body weight | Urinary Radiocalcium Excretion |
|---|---|
| Control | 100 |
| 9,200 Units of Vitamin D | 51 |
| 1 mg. of Hydrocortisone | 137 |
| 1 mg. of Hydrocortisone plus 9.2 Units of Vitamin D | 95 |
| 1 mg. of Hydrocortisone plus 92.0 Units of Vitamin D | 93 |
| 1 mg. of Hydrocortisone plus 920.0 Units of Vitamin D | 1 (225) |
| 1 mg. of Hydrocortisone plus 9,200.0 Units of Vitamin D | 76 |
| 1 mg. of Hydrocortisone plus 46,000.0 Units of Vitamin D | 96 |

[1] Inexplicable result which has not occurred again.

The above data indicate an interrelationship between adrenal cortical steroids and vitamin D in bone metabolism in which vitamin D can be said to play the part of a coordinating agent for maintaining a proper balance of calcium excretion. The degree of vitamin D counteraction to calcium loss in the body system resulting from adrenal cortical steroid administration is directly measured in terms of the beneficial change in calcium balance caused by the coadministration of graded doses of vitamin D. Proper adjustment of the vitamin D dosage, moreover, will permit not only a decrease in calcium excretion but also a restoration of the calcium balance in the body to normal levels.

Table II shows similar activity with respect to the potent steroid prednisolone. This steroid was administered to rats over a twenty-four hour period both with and without coadministration of vitamin D. The test results clearly establish the ability of vitamin D to suppress the increase in calcium excretion which normally accompanies the administration of the steroid alone. These data demonstrate that the simultaneous presence of vitamin D essentially restores the overall calcium excretion to normal levels.

Table II

| Dose/100 gms. of rat body weight | Urinary Radiocalcium Excretion (in total counts) | | |
|---|---|---|---|
| | 0–8 Hours | 8–24 Hours | 0–24 Hours |
| Control | 11,000 | 25,000 | 37,000 |
| 0.5 mg. of Prednisolone | 25,000 | 31,000 | 56,000 |
| 0.5 mg. of Prednisolone plus 4,000 Units of Vitamin D | 13,000 | 26,000 | 39,000 |

Table III presents further evidence of the significant action of the coadministration of vitamin D and steroids. The results of the action of graded amounts of vitamin D with prednisolone, tested in rats over a prolonged period of twenty-four days, are shown.

In this connection, a well-recognized difficulty which is encountered in calcium balance studies is the effect of the previous dietary history. In order to eliminate this factor, the first eight days of the experiment were considered a dietary preconditioning period and the urinary excretion data obtained during this time were omitted from Table III.

As a further preliminary procedure, two months prior to the testing period the animals which were to be tested were subjected to the usual tracer dose of radioactive cacium in order to label their bones.

The rats which were employed in the experiment covered by Table III were placed on a calcium-free diet throughout the twenty-four day test period, and urine was collected daily.

Table III

| Dose/100 gms. of rat body weight | Food Consumption (20 days) gms. | Body Weight Change, gms. | Urinary Calcium-40 Excretion (16 days) mg. |
|---|---|---|---|
| Control | 290 | +28 | 23.0 |
| 0.5 mg. of Prednisolone | 260 | −55 | 27.0 |
| 0.5 mg. of Prednisolone plus 5 Units of Vitamin D | 220 | −56 | 19.0 |
| 0.5 mg. of Prednisolone plus 50 Units of Vitamin D | 225 | −65 | 22.0 |
| 0.5 mg. of Prednisolone plus 500 Units of Vitamin D | 215 | −65 | 21.0 |

Through the urinary calcium$^{-40}$ excretion data, Table III indicates that an increase in excretion above normal levels occurs after treatment with prednisolone, while a decrease towards the normal level occurs upon the addition of a physiological dose of vitamin D in conjunction with the steroid. Significantly, the total calcium$^{-40}$ excretion in all cases fell to the control level or below during the sixteen-day test period. Increasing the vitamin D dosage to pharmacologic quantities does not appear to effect the stabilizing action of vitamin D on bone metabolism.

From Table III it would seem at first glance that vitamin D has no effect upon reversing the weight loss caused by the administration of prednisolone alone. Upon closer examination, however, it is seen that the rats subjected to the diet which included the steroid as well as vitamin D ate about forty grams less food than did the rats subjected to the diet which included the steroid alone, yet both groups of rats lost about the same amount of weight. This indicates that coadministration of vitamin D with the steroid actually enables the body to better utilize its food intake.

Table IV

| Dose/100 gms. of rat body weight | Urinary Radiocalcium Excretion (in proportional counts) | | |
|---|---|---|---|
| | 0–8 Hours | 8–24 Hours | 0–24 Hours |
| Control | 100 | 100 | 100 |
| 2 mg. of Prednisolone | 221 | 123 | 154 |
| 2 mg. of Prednisolone plus 4,000 Units of Vitamin D | 112 | 109 | 109 |

The above values are relative to the control values which were arbitrarily set at 100.

Table IV illustrates the overall potent effectiveness of coadministration of vitamin D with steroids. In this case, 2.0 mgs. of the potent steroid, prednisolone, were administered rather than 0.5 mg. as in Table II. While administration of the adrenal cortical steroid alone produced a high increase of calcium excretion over control values, coadministration with vitamin D decreased calcium excretion values to little more than normal.

Thus, in accordance with the present invention, coadministration of vitamin D with steroids causes a marked decrease in the excretion of bone calcium even when the most potent steroids are employed. It follows that this stabilizing action of vitamin D on bone metabolism is of inestimable value in treatments requiring adrenal cortical steroid administration. Consequently, the heretofore detrimental loss of normal body calcium associated with steroid administration alone may be effectively minimized and even eliminated.

The hereinabove discussed beneficial activity of vitamin D is exhibited when it is administered in amounts ranging from physiologic to non-toxic doses with all biologically active steroids and their derivatives, and in particular with 11-oxygenated cortical steroids and their derivatives.

While the foregoing specification has been set forth by way of illustration, it will be understood that various modifications and changes may be made without departing from the spirit and scope of the present invention which is to be limited only by the scope of the appended claims.

What is claimed is:

1. A therapeutic preparation comprising a mixture of vitamin D in at least a physiologic amount and a therapeutic dosage of a biologically active anti-inflammatory steroid compound.

2. A therapeutic preparation comprising a mixture of vitamin D in a non-toxic amount and a therapeutic dosage of a biologically active anti-inflammatory steroid compound.

3. A therapeutic preparation comprising a mixture of vitamin D in at least a physiologic amount and a therapeutic dosage of an anti-inflammatory steroid compound selected from the group consisting of pregnenes and derivatives thereof.

4. A therapeutic preparation comprising a mixture of vitamin D in a non-toxic amount and a therapeutic dosage of prednisolone.

5. A therapeutic preparation comprising a mixture of vitamin D in a non-toxic amount and a therapeutic dosage of hydrocortisone.

6. A therapeutic preparation for preventing hypercalcuria which results from adrenal cortical steroid administration which comprises a mixture of vitamin D in a non-toxic amount and in at least a physiologic amount with a therapeutic dosage of an anti-inflammatory steroid compound.

7. A therapeutic preparation according to claim 6 wherein the anti-inflammatory steroid compound is selected from the group consisting of pregnenes and derivatives thereof.

8. A process for preventing hypercalcuria which results from anti-inflammatory steroid administration which comprises coadministering vitamin D with the steroid, said vitamin D being present in a non-toxic amount and in at least a physiologic amount.

9. A process for diminishing bone resorption which results from anti-inflammatory steroid administration which comprises administering said steroid in the presence of vitamin D in at least a physiologic amount in the body system.

10. A therapeutic preparation comprising a mixture of vitamin D in at least a physiologic amount and a therapeutic dosage of an anti-inflammatory glucocorticosteroid compound.

11. A therapeutic preparation comprising a mixture of vitamin D in a non-toxic amount and a therapeutic dosage of an anti-inflammatory glucocorticosteroid compound.

12. A therapeutic preparation comprising a mixture of vitamin D in a non-toxic amount and a therapeutic dosage of an anti-inflammatory steroid compound selected from the group consisting of pregnenes and derivatives thereof.

13. A therapeutic preparation for preventing hypercalcuria which results from steroid administration which comprises a mixture of a therapeutic dosage of vitamin D and a therapeutic dosage of an anti-inflammatory steroid compound selected from the group consisting of pregnenes and derivatives thereof.

References Cited in the file of this patent

Henneman, Albright et al.: J. Clin. Invest. 35:1229–1242, 1956.
Freyberg et al.: Arch. Int. Med., 58:213–228, 1936.
Colcher et al.: Ann. Int. Med., 38:554–568, 1953.
Harrell et al.: J. Clin. Invest. 18:687–693, 1939.
Anderson et al.: Lancet 2:720–724, 1954.
Connor et al.: J. Clin. Endocrinol. and Metabolism, Abst. 75, 16:945, 1956.
Dent: Brit. Med. Jour. 1:230, 1956.
Dent: Brit. Med. Jour. 2:808–810, 1953.